March 26, 1957     E. OSBORN     2,786,370
LAWN MOWER SHARPENER
Filed Oct. 24, 1955     2 Sheets-Sheet 1
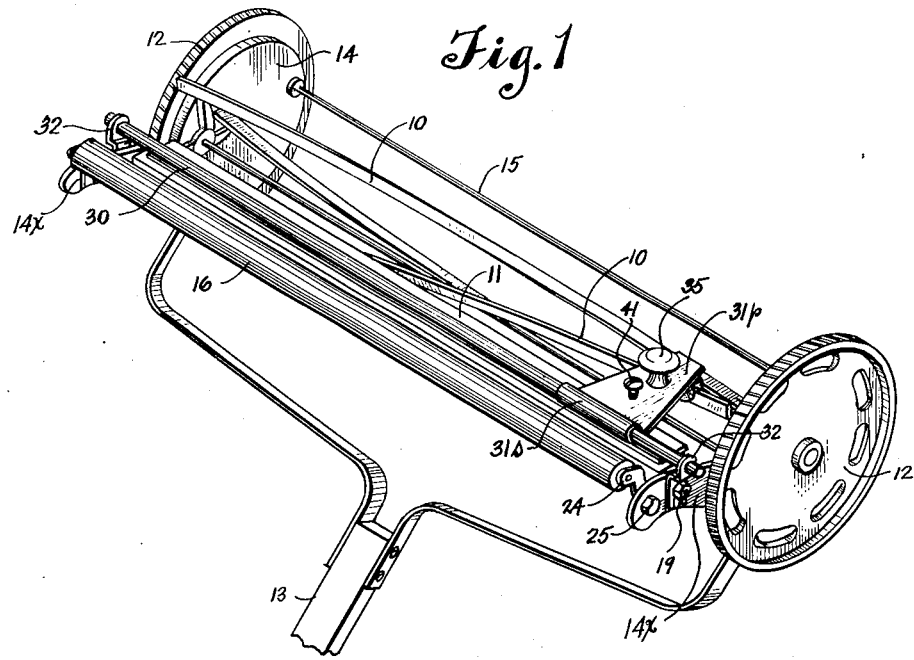
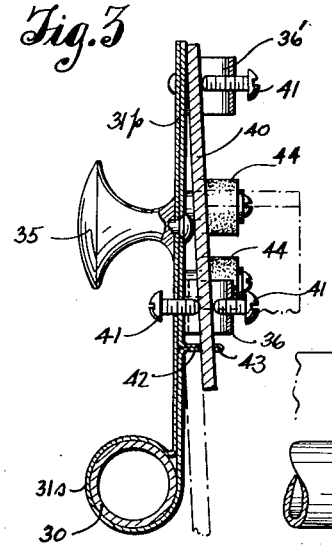
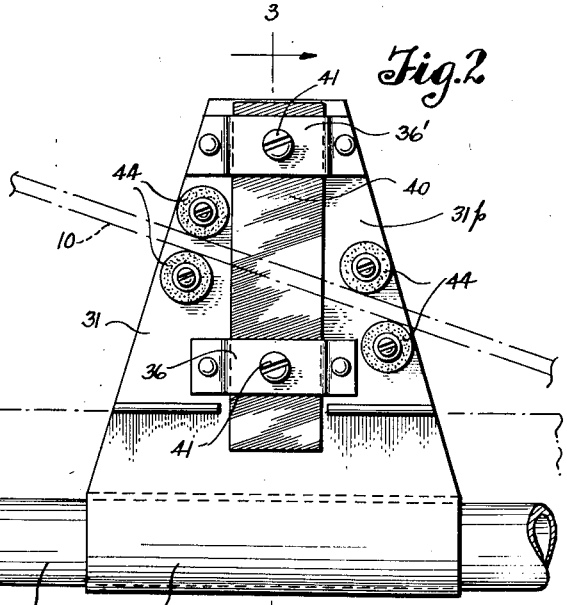
INVENTOR.
ELEMUEL OSBORN
BY
Cook & Robinson
ATTORNEYS March 26, 1957  E. OSBORN  2,786,370
LAWN MOWER SHARPENER
Filed Oct. 24, 1955  2 Sheets-Sheet 2
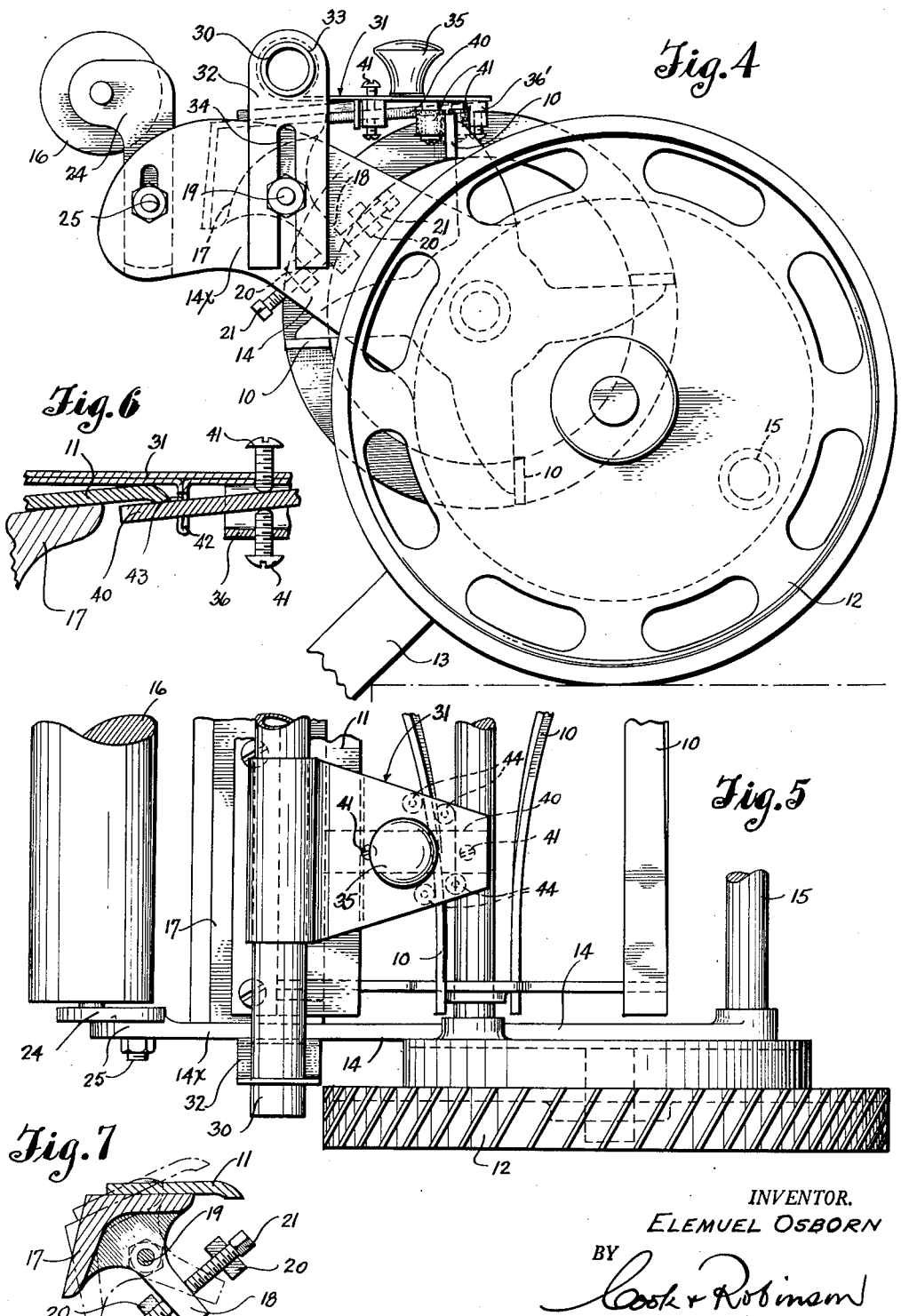
INVENTOR.
ELEMUEL OSBORN
BY
Cook + Robinson
ATTORNEYS

United States Patent Office 2,786,370
Patented Mar. 26, 1957

2,786,370

LAWN MOWER SHARPENER

Elemuel Osborn, Seattle, Wash.

Application October 24, 1955, Serial No. 542,162

5 Claims. (Cl. 76—82.1)

This invention relates to lawn mower sharpeners, and it has reference more particularly to the provision of an easily applied and manual operable device for that particular purpose.

It is the principal object of this invention to provide a lawn mower sharpening means of relatively simple construction; that is easy to apply to any of the usual types of mowers and easy to use both for the sharpening of the straight base blade of the mower and also the spiral, revolvable blades of the driven reel that coact with the base blade.

Another object of the invention is to provide a lawn mower sharpening device of the above character having a blade sharpening element that can be set for sharpening the base blade and a spiral blade in the same sharpening operation.

Yet another object is to provide a lawn mower sharpener wherein a carrier member for the blade sharpening element is mounted for reciprocal movement along the edge of any of the spiral blades to be sharpened and in its reciprocal movements, is adapted to engage with the base blade mounting bar of the mower to definitely limit the extent to which the material of any spiral blade is removed in the sharpening operation, thus to insure the sharpening of all blades of the reel to the same extent and to exact coincidence with the base blade.

Still further objects and advantages of the present invention reside in the details of construction and combination of the various parts embodied in the sharpening device; in their relationship to each other, and in their mode of operation, as will hereinafter be fully described.

In accomplishing the above mentioned and other objects of the invention, I have provided the improved details of construction, the preferred forms of which are illustrated in the accompanying drawings, wherein:

Fig. 1 is a perspective view showing a lawn mower as disposed in position for sharpening, and with the present sharpener applied thereto.

Fig. 2 is an underside view of the sharpening device.

Fig. 3 is a cross-section of the same, taken on line 3—3 in Fig. 2.

Fig. 4 is an end view of the lawn mower with sharpener applied thereto.

Fig. 5 is a top view of the end portion of the mower as seen in Fig. 4.

Fig. 6 is a sectional detail showing sharpening of the base bar.

Fig. 7 is a sectional detail of the mounting bar for the base blade.

Referring more in detail to the drawings:

In Fig. 1, I have shown a conventional form of lawn mower as supported in an inverted position for convenience in the blade sharpening operation, and have illustrated the sharpening device of the present invention as applied functionally thereto.

The lawn mower herein shown is typical of present day mowers in that it comprises the usual plural bladed reel, mounted for axial rotation in a rigid frame structure and adapted to be driven through the usual or any suitable geared connection between its mounting shaft and the two ground wheels of the mower. The spirally extending blades of the reel are arranged to coact with a base or bottom blade that is adjustably fixed in the mower frame structure, for the grass cutting operation. In the several views of the drawings, the spiral blades of the cutting reel are designated by the reference numeral 10; the base blade by numeral 11 and the ground wheels of the mower by numerals 12. The rigid frame structure of the machine, to which the handle 13 is attached, comprises opposite end plates 14 that are joined rigidly in parallel spaced relationship by cross-rods 15. These plates, which mount the wheels 12 thereon, have rearward extensions 14x between which the usual ground engaging roller 16 is mounted. Also, between which extensions the base blade 11 of the mower is functionally mounted.

It is shown in Figs. 4, 5 and 6 that the base blade 11 lies flatly upon the top side of and is fixed to a cross-bar 17 which is equipped at its opposite ends with supporting levers 18 that extend parallel with and closely along the inside faces of the end plates 14. These levers are pivotally secured to the corresponding plates by pivot bolts 19 and the end of each lever extends between spaced lugs 20—20 formed on the adjacent plate 14 and is engaged at upper and lower sides by the ends of adjusting screws 21—21 that are threaded through the lugs as shown in Fig. 7. By the adjustment of these screws, acting on the levers 18, the bar 17 can be tilted to more or less extent to cause the forward edge of the blade 11, as fixed thereto, to be adjusted relative to the reel.

The roller 16 is mounted at its opposite ends by legs 24—24 that are slidably secured to the frame extensions 14x by bolts 25, to permit adjustment of the roller to change the elevation of the cutting blades relative to a ground surface.

The means for mounting the base bar 17 and blade 11, and the roller 16, as above described, are conventional and do not comprise any part of the present invention. However, the adjustment of the bar 17 is useful in the application and mode of operation of the present device.

The present device comprises a straight, cylindrical cross-rod 30 of uniform diameter, equipped with means at its opposite ends for fixedly mounting it on the frame structure of the mower, and a reciprocally movable blade sharpening tool, which is designated in its entirety by numeral 31. This tool is mounted for manual reciprocal action along the cross-rod 30 and also for oscillating movement to swing it toward and away from the blades of the reel.

The cross-rod 30 has a length somewhat greater than the width of the mower frame structure, and preferably but not necessarily is about ¾ inch in diameter. In use, it is supported on the frame of the inverted mower, as noted in Figs. 1 and 4, at a distance slightly above and slightly forward of the roller 16 by means of brackets 32—32 applied to its opposite ends; these brackets are in the form of plates having outwardly offset end portions formed with round holes 33 through which the end portions of the rod 30 extend for the support of the rod, and having longitudinal slots 34 along their opposite end portions through which the bolts 19 which secure the bar 17 to the frame extensions may be extended for their fixed securement.

The sharpening tool 31 comprises a flat metal plate 31p, preferably of the triangular form shown on Fig. 2, and formed along its base edge, parallel with the plane of the plate, with a tubular bearing sleeve 31s that fits the rod 30 and provides for the reciprocal movement of the tool thereon to the full length of the blades to be sharpened.

Fixed to the top side of the plate 31p is a knob 35 serving as a handle whereby the tool can be manually reciprocally actuated. Fixed to the underside of the plate 31 are guides 36 and 36', forming holders in which the blade sharpening element or bar 40 is mounted. This element is in the form of a short flat file blade. It extends endwise through the guides 36 and 36' and is adapted to be clamped at any set position by the engagement therewith of set screws 41 that are threaded through the guides and also through the plate 31p.

It is to be observed by reference to Fig. 6 that the inner end portion of the sharpening bar 40 is rested in a notch 42 that is formed in a downwardly directed flange 43 formed on and transversely across the underside of the plate 31p. This flange holds the inner end portion of the bar spaced from the plate for a purpose presently to be disclosed.

Mounted rotatably on the underside of the plate 31p on axes perpendicular to the plate and at opposite sides of the sharpening bar 40, are pairs of rollers 44—44. The rollers of each pair are slightly spaced, in a direction radially of the rod 30, and the pairs are set at different distances from the axial line of rod 30 as will be understood by reference to Fig. 2 for a purpose that presently will be understood.

Assuming the parts of the mower sharpening device to be so constructed, and assembled, it is applied for use to a lawn mower in the following manner.

First, for most satisfactory operation, the lawn mower is inverted and fixedly disposed in the position in which it has been shown in Fig. 1. Then the clamping nuts on bolts 19 are loosened and the slotted ends of the brackets 32—32 are applied thereto as shown in Fig. 2 and temporarily held movably in place. The base bar 17 is then adjusted by manipulation of set screws 21—21 to clear the bar edge substantially from the reel blades and allow the reel to turn freely in its mountings. The tool 31 is then applied to rod 30 and the opposite ends of the rod applied through the holes 33 in the brackets 32—32. The tool 31 is then shifted to one end of the mower reel, and swung to a position about rod 30 at which the blade sharpening bar 40 thereof rests flatly against the cutting edge of one of the spiral blades 10 of the reel. The bracket 32 at that end is then rigidly fixed in position by drawing the nut on the corresponding bolt 19 down tight. In this placement of the bar 40 of the sharpening tool against the blade of the reel, the blade is caused to be received between the rollers of the pairs of rollers at opposite sides of the bar 40. It is due to fact that the blade extends spirally of the reel that the pairs of rollers are at different distances from the rod 30. Then the sharpener 31 is shifted to the opposite end of the mower reel, placed against the blade as before, and a similar adjustment of the rod mounting bracket 32 at that end is made and secured.

After the position of the cross bar 30 has been accurately established, the base bar 17, which previously had been adjusted to cause the blade 11 to be held in the clear of the blades of the reel, is readjusted, if necessary, to serve as a depth gauge and guide to be engaged by the underside of the plate 31p just within the flange 43. Adjustment of the base bar 17, as effected by the manipulation of the set screws, 21—21, can thus serve to limit the extent to which the sharpening bar 40 can remove metal from the blades of the reel.

With these adjustments made, the sharpening tool 31 is swung about rod 30 to a position at which the bar 40, or sharpener, rests against the edge of a blade of the reel; the blade passing between the rollers of each pair of rollers at opposite side of the bar 40 as indicated in Fig. 2. Then the tool is moved reciprocally on rod 30 to the full length of the blade. As it moves from end to end of the blade, the reel is moved thereby and rotated in opposite directions accordingly. This sharpening action is continued until the plate 31p rides on the top face of bar 17 as seen in Fig. 6, and the blade sharpening element 40 has no more effect on the blade. Then the sharpener 31 is lifted, and the reel advanced to permit the bar 40 to be placed for sharpening against the next spiral blade and the sharpening operation repeated. The foregoing operation is repeated until all spiral blades have been sharpened.

To sharpen the base blade, 11, the sharpening bar 40 is released in its holding guides for endwise adjustment by loosening the set screws 41. Then it is shifted inwardly to cause its inner end portion to be extended beneath the forward edge of the blade as shown in Fig. 6. Then the set screws 41 are adjusted and tightened as may be required to hold the bar 40 in proper position for the sharpening of the blade edge. The tool 31 is then moved reciprocally on bar 30 to effect the sharpening operation.

It is to be pointed out that, as a feature of this device, the sharpening of a spiral blade of the reel and the base blade 11 can be carried out simultaneously if it is so desired. This requires only that proper adjustment of the base bar 17 be made after the element 40 has been adjusted to position, to cause the bar 40 to properly engage with both blades simultaneously.

Sharpeners of this kind are simple in construction, easy to apply, easy to use and satisfactory in results. The device is easily adaptable to lawn mowers of various makes and provides for "on the job" or in the home sharpening.

While I have illustrated this sharpener in connection with a present day type of manually pushed mower, it is to be explained that it is just as well adapted for application, either in the form shown or by slight modifications thereto, for the sharpening of certain present day types of power mowers employing the rotating reel.

Having thus described my invention, what I claim as new therein, and desire to secure by Letters Patent is:

1. A blade sharpening means for a lawn mower having opposite end frames, a reel comprising a plurality of blades extending lengthwise thereof in a spiral direction, mounted for axial rotation between said end frames and a base blade adapted for coacting with the blades of the reel and having mounting means whereby it is adapted to be functionally supported for coaction with the reel or adjusted to a position free of and parallel to the reel axis; said blade sharpening means comprising a cross-rod, brackets applied to opposite end portions of said cross-rod and to said end frames for support of said rod parallel with the reel axis, a blade sharpening tool comprising a plate that is mounted at one end for oscillation on and reciprocal movement along the cross-rod and an abrasive sharpening bar adjustably fixed to the underside of said plate at a right angle to the cross-rod, means on the plate for adjusting the sharpening bar angularly with reference to the plane of the plate; said plate being adapted to be swung on said rod to a position extended across a blade of the reel to dispose said sharpening bar across the blade edge in blade sharpening position, and guides on the plate for receiving the blade to be sharpened between them and whereby reciprocal movement of the plate along the cross-rod will cause the reel to be rotated on its axis as required to maintain the blade edge, as contacted by the abrasive sharpening bar, in proper position for sharpening by said bar.

2. A blade sharpening means as recited in claim 1 wherein the plate of the sharpening tool, when in blade sharpening position, extends across the underside of said base blade of the mower, and is adapted to engage in sliding contact with the base blade to limit the extent to which the said plate can swing toward the reel, and thus to limit the extent to which the reel blade edge can be removed by the abrasive bar.

3. A blade sharpening means as recited in claim 1 wherein said guides, as applied to the underside of the reciprocable plate, comprise two pairs of rollers, disposed at opposite sides of the abrasive bar, and between which rollers of each pair, the blade passes for rolling contact of said rollers therewith in the reciprocal action of the tool along the cross-rod.

4. The blade sharpening means of claim 1 wherein the abrasive bar passes endwise through guides fixed to said plate, and wherein the bar is held in said guides between set screws, and said set screws are adjustably mounted for angularly adjusting the inner end of the bar toward or from the plane of the plate.

5. The blade sharpening means of claim 4 wherein the abrasive bar is adjustable in its longitudinal direction and is adapted to be adjusted to be engaged in sharpening position against the edge of the base blade while resting in sharpening contact with a blade of the reel, providing for their simultaneous sharpening incident to reciprocal action of the tool along the cross-rod.

References Cited in the file of this patent

UNITED STATES PATENTS

| | | |
|---|---|---|
| 1,751,020 | Alison | Mar. 18, 1930 |
| 1,987,348 | Nelson | Jan. 8, 1935 |
| 2,141,359 | McKittrick | Dec. 27, 1938 |
| 2,321,953 | Tedd | June 15, 1943 |